Nov. 25, 1952     E. L. BYRKETT     2,618,964
DEVICE FOR GAUGING SURFACE CHARACTERISTICS
Filed April 4, 1950
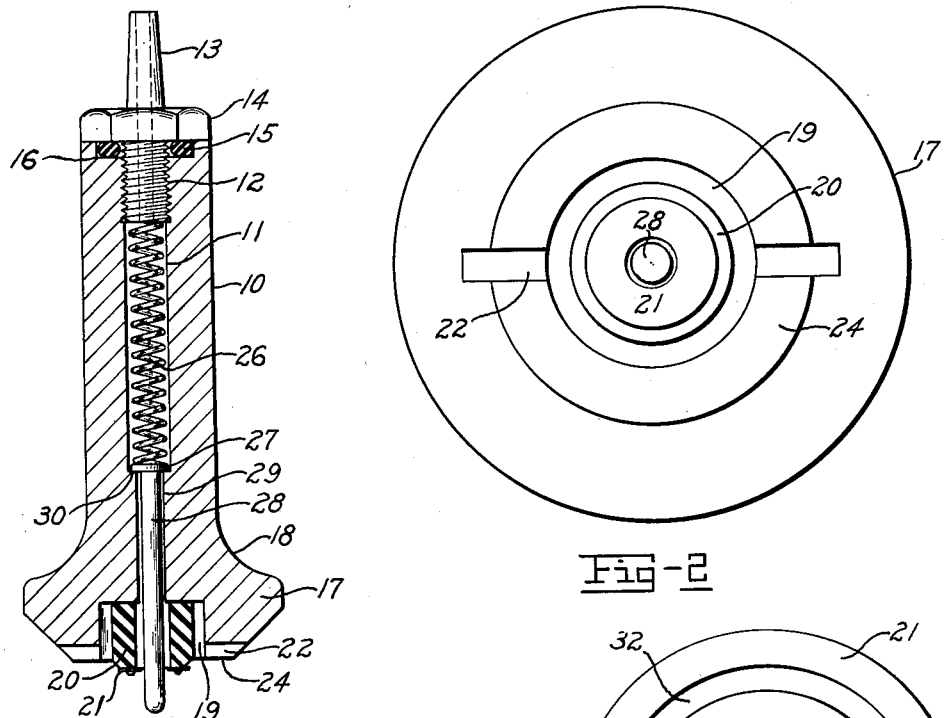
Fig-1
Fig-2
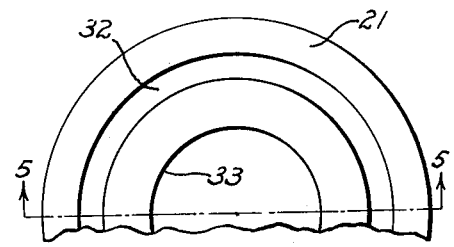
Fig-4
Fig-5
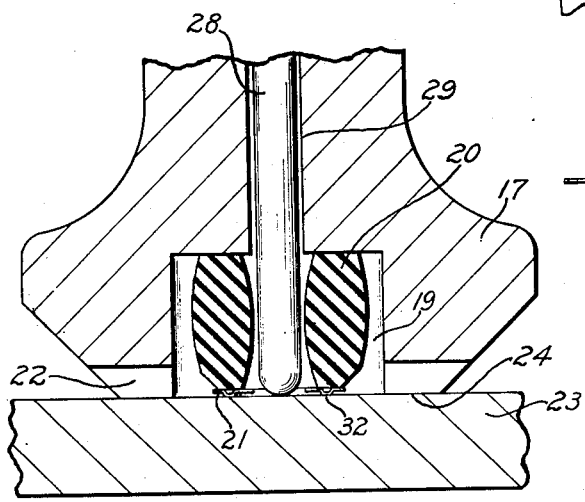
Fig-3
INVENTOR.
E. L. Byrkett
BY Edward T. Noig Jr.
atty

UNITED STATES PATENT OFFICE 2,618,964

DEVICE FOR GAUGING SURFACE CHARACTERISTICS

Elwood L. Byrkett, Dayton, Ohio, assignor to The Sheffield Corporation, Dayton, Ohio, a corporation of Ohio Application April 4, 1950, Serial No. 153,889

7 Claims. (Cl. 73—37)

This invention relates to gauging devices and more particularly to gauging devices adapted for cooperation with a surface to gauge a characteristic of such surface in terms of fluid leakage.

One object of the invention is the provision of a gauging head that can be applied to a surface to gauge a characteristic of the surface such as the surface finish, that portion of the head which is applied to the surface including a thin centrally perforated sheet of hard material carried by a ring of yielding material, the construction being such that uniform conditions of gauging pressure are obtained.

Another object is the provision of a gauge head of the character mentioned in which the surface contacting sheet has an annular rib of small radial dimension, such rib being applicable to the surface to be gauged and serving to space the remaining portion of the sheet from such surface.

A further object of the invention is the provision of a gauging head having a recess at one end in which there is a ring of yielding material supporting a thin centrally perforated sheet of metal, the size of the ring of yielding material being such that the surface contacting sheet normally extends beyond the end of the body but when manual pressure is applied on the head the end of the head is brought into contact with the surface and determines the amount of gauging pressure that will be applied in a gauging operation.

Still another object is the provision of a gauging head of the character mentioned, having a projecting means normally projecting through the center of the surface contacting sheet to protect the latter.

Other objects and advantages of the invention will be apparent from the following description, the appended claims and the accompanying drawing, in which Fig. 1 is a central longitudinal section through a gauging head embodying the present invention;

Fig. 2 is an end view of the gauging head on an enlarged scale;

Fig. 3 is an enlarged sectional view of the lower portion of the gauging head in gauging position;

Fig. 4 is an enlarged view of a portion of the surface contacting sheet; and

Fig. 5 is a central section on the line 5—5 of Fig. 4.

Referring more particularly to the drawing in which the same reference numerals are applied to like parts in the several views, the embodiment of the invention as herein disclosed is particularly suitable for gauging surface finish of a flat piece of metal or other material or of a piece which is of generally curved formation. Measurements of surface finish may be obtained in terms of fluid leakage taking place through the crevices lying beneath the effective gauging area of a surface contacting sheet, as will be more fully explained. Measurements of the amount of flow of air or other suitable gaseous medium existing when the gauging head is applied to an unknown part as compared to the flow existing when the gauging head is applied to a master of known surface finish.

The gauging head comprises a body 10 having a central passage 11 terminating in a threaded passage 12. A tube connection 13 is threaded in the passage 12, the tube connection having a hexagonal shoulder portion 14 engaging the upper end of the body 10 and compressing a torus 15 of rubber in a recess 16 so as to seal the connection against leakage. Regulated air under pressure is applied to a fluid flow gauging device that measures flow either by gauging the pressure drop across a restriction or by directly measuring the actual rate of air flow, and as such devices are well known it is unnecessary to explain here any of the details of the flow gauging device. Air is supplied from the flow gauging device through a tube attached to the connection 13.

The body 10 has an enlarged base portion 17 the out-flaring sides 18 of which can be conveniently grasped by the fingers of the operator. This enlarged base portion has a recess 19 which partly contains a ring 20 of rubber or other suitable yielding elastic material capable of being deformed by manual pressure. The upper surface of this ring is cemented to the downwardly facing portion of the recess and the lower surface of the ring is cemented to a thin flexible sheet 21 of suitable hard material. The material should be such as to have adequate hardness so that its outer surface, which engages the work to be tested, can be given a smooth polished surface and so it will not deform to fit itself into crevices or small irregularities in the work. Steel has been found to be a very satisfactory material for this purpose. The lower end of the body has one or more traverse grooves 22 for the escape of air. Normally, when the head is not applied to the work to be gauged, the surface contacting sheet 21 is located some small distance beyond the adjacent end of the body. However, the thickness of the ring 20 is such that when a manual pressure is applied to the body 10 and through the rubber ring 20 and the sheet 21 to a workpiece or a part 23, then the terminal end 24 of the body is brought into contact with the part 23, the rubber ring 20 being compressed. Since the amount of compression that takes place in the ring 20 is constant, determined by the distance between the exposed outer side of the surface contacting sheet 21 and the terminal end 24 of the body, there will be assurance of a constant predetermined gauging pressure in a gauging operation.

A spring 26 is contained within the passage 11 of the body, the lower end of the spring engaging a head portion 27 of a protecting pin 28 which is provided within the lower part 29 of passage 27. The lower end of this pin projects down through the ring 20 and the sheet 21 and normally, when the head is not applied to a workpiece, the end of the pin projects a considerable distance through the central opening in the sheet 21 and prevents or greatly reduces the liability of damage to the sheet 21. When the gauge head is applied to a workpiece the spring 11 readily compresses as the pin 28 is pushed upwardly by the workpiece to the position shown in Fig. 3. If desired, the head 27 on the pin may have a seating engagement with the adjacent shoulder portion 30 to shut off air flow under normal conditions when the device is not in use. Air is permitted to flow down through the passage 29 however, as soon as the head is applied to a workpiece to be gauged.

The sheet 21 as shown on an enlarged scale in Figs. 4 and 5 has an annular rib 32 of limited size in a radial direction. The sheet has a central perforation or hole 33, and is continuous in an annular direction so that air flowing through the passage 29 and then through the passage in the rubber ring can only leak out past the rib 32, between that rib and the part 23 against which the rib is compressed. The sheet 21 is quite thin so that it can bend to conform to a curved part having a radius of curvature of several inches for example. Very satisfactory results have been obtained where the sheet 21 has an outside diameter of about one-quarter inch, a rib width for the rib 32 of about one-sixty-fourth of an inch, and a sheet thickness of about two-thousandths of an inch. A sheet thickness which is much greater than the figure given can be employed if only flat surfaces are to be gauged or if the radius of curvature of the surface to be gauged is quite large.

The exposed side of the rib 32 has a very smooth finish and is contained in a geometric plane spaced a little distance from the remaining portion of the sheet. If there are tiny scratches in the surface of the part 23 to be gauged, air supplied under pressure to the gauging head can travel below the rib 32 and along these crevices and the amount of air leakage that takes place can be compared with the value obtained when the device is applied to a master of known surface finish. If the crevices are large in the work surface, then obviously more air supplied under the predetermined pressure will leak out. With a limited area of contact between the surface 21 and the workpiece, and with a uniform physical pressure applied to the surface 21, the probability of error is greatly reduced and reliable readings can be obtained. Since the sheet 21 is thin and since it is carried by a ring of rubber or the like, it will be apparent that the sheet will adapt itself to the general curvature of the surface to be gauged although it will not close into the scratches or crevices in the workpiece.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gauging head adapted for cooperation with a surface to gauge a characteristic of said surface through leakage of fluid supplied under pressure to said head, said head comprising a body having a fluid passage adapted for connection at one end to a fluid flow measuring device, a ring of yielding material attached to said body at the other end of said passage, a thin centrally perforated sheet of hard material attached to said ring and adapted for cooperation with the surface to be gauged, said body having portions rigid therewith and extending part way along opposite sides of the ring of yielding material for contact with the surface to be gauged after compressing the said ring by pressure applied to the body, to thus limit the pressure that can be applied to said sheet to some predetermined value.

2. A gauging head adapted for cooperation with a surface to gauge a characteristic of said surface through leakage of fluid supplied under pressure to said head, said head comprising a body having a fluid passage adapted for connection at one end to a fluid flow measuring device, a ring of yielding material attached to said body at the other end of said passage, a thin centrally perforated sheet of hard material attached to said ring and adapted for cooperation with the surface to be gauged, said sheet having an annular rib of small radial dimension for spacing the remaining portion of the sheet from the surface to be gauged.

3. A gauging head adapted for cooperation with a surface to gauge a characteristic of said surface through leakage of fluid supplied under pressure to said head, said head comprising a body having a fluid passage adapted for connection at one end to a fluid flow measuring device, a ring of yielding material attached to said body at the other end of said passage, a thin centrally perforated sheet of hard material attached to said ring and adapted for cooperation with the surface to be gauged, said sheet being normally flat but being sufficiently flexible to conform generally to general surface irregularities of the surface to be gauged, and means normally projecting through said sheet for protecting said sheet.

4. A gauging head adapted for cooperation with a surface to gauge a characteristic of said surface through leakage of fluid supplied under pressure to said head, said head comprising a body having a fluid passage adapted for connection at one end to a fluid flow measuring device, a ring of yielding material attached to said body at the other end of said passage, a thin centrally perforated sheet of hard material attached to said ring and adapted for cooperation with the surface to be gauged, said sheet having a radially restricted annular rib projecting from the outer surface thereof and providing a surface contacting portion for gauging surface finish, the end of said body adjacent said ring normally extending partly around said ring.

5. A gauging head adapted for cooperation with a surface to gauge a characteristic of said surface through leakage of fluid supplied under pressure to said head, said head comprising a body having a fluid passage adapted for connection at one end to a fluid flow measuring device, said head having a recess at one end thereof, a ring of yielding material attached to said body in said recess and having a central hole in communication with the other end of the passage in the body, a thin centrally perforated sheet of metal attached to said ring and adapted for cooperation with the surface to be gauged, the thickness of the ring of yielding material being sufficient so the exposed side of said sheet normally extends beyond the end of the body and the ring having such yielding qualities that a manual pressure on the head applied through the ring to the sheet will bring the end of the head adjacent said recess into contact with the surface engaged by the sheet.

6. A gauging head as set forth in claim 5, together with a spring pressed plunger carried by said head and normally projecting through the center of said sheet to protect the sheet.

7. A gauging head as set forth in claim 5, said sheet having an annular rib projecting from its outer face to space the remaining portion of the sheet from the surface to be gaged.

ELWOOD L. BYRKETT.

REFERENCES CITED

The following references are of record in the file of this patent:

UNITED STATES PATENTS

| Number | Name | Date |
| --- | --- | --- |
| 2,375,600 | Wattebot | May 8, 1945 |
| 2,403,897 | Aller | July 16, 1946 |
| 2,417,988 | Mooney | Mar. 25, 1947 |

FOREIGN PATENTS

| Number | Country | Date |
| --- | --- | --- |
| 875,738 | France | Oct. 1, 1942 |
| 577,294 | Great Britain | May 13, 1946 |